Oct. 25, 1938.   A. J. ALLEN   2,133,944
METER BOX
Filed June 18, 1937   2 Sheets-Sheet 1
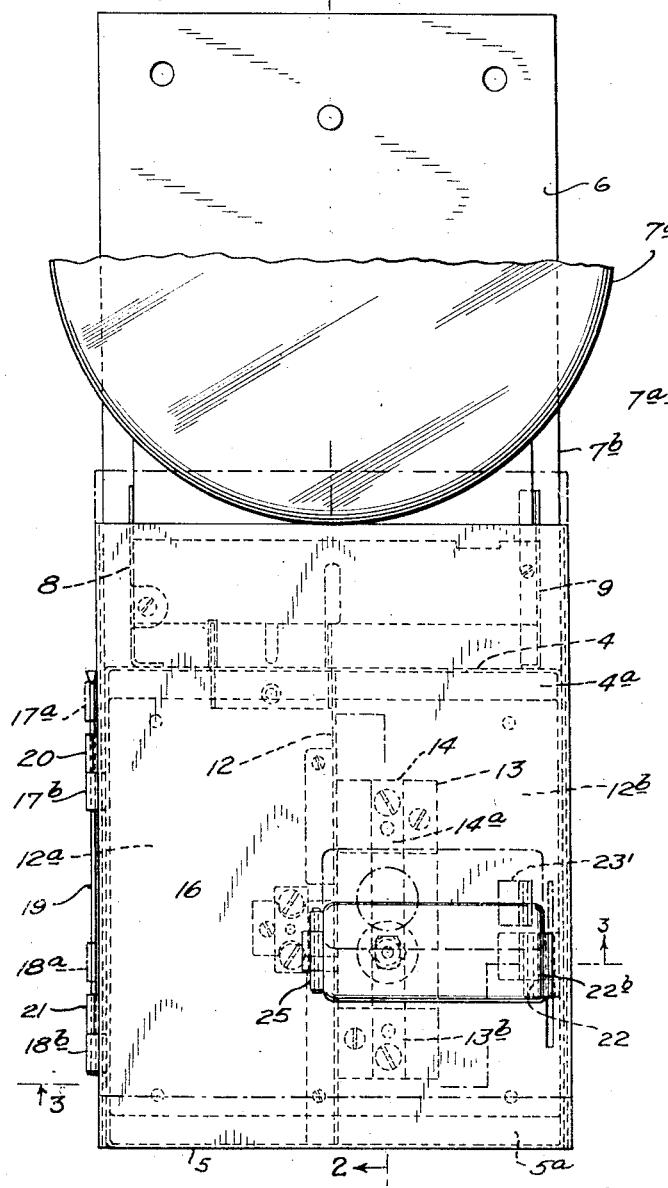
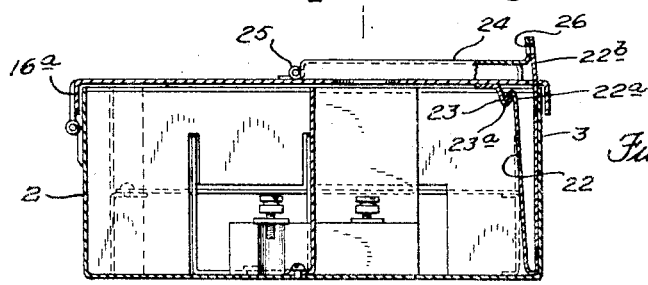
INVENTOR
Albert J. Allen
BY
George F. Gill
ATTORNEY Oct. 25, 1938.   A. J. ALLEN   2,133,944
METER BOX
Filed June 18, 1937   2 Sheets-Sheet 2
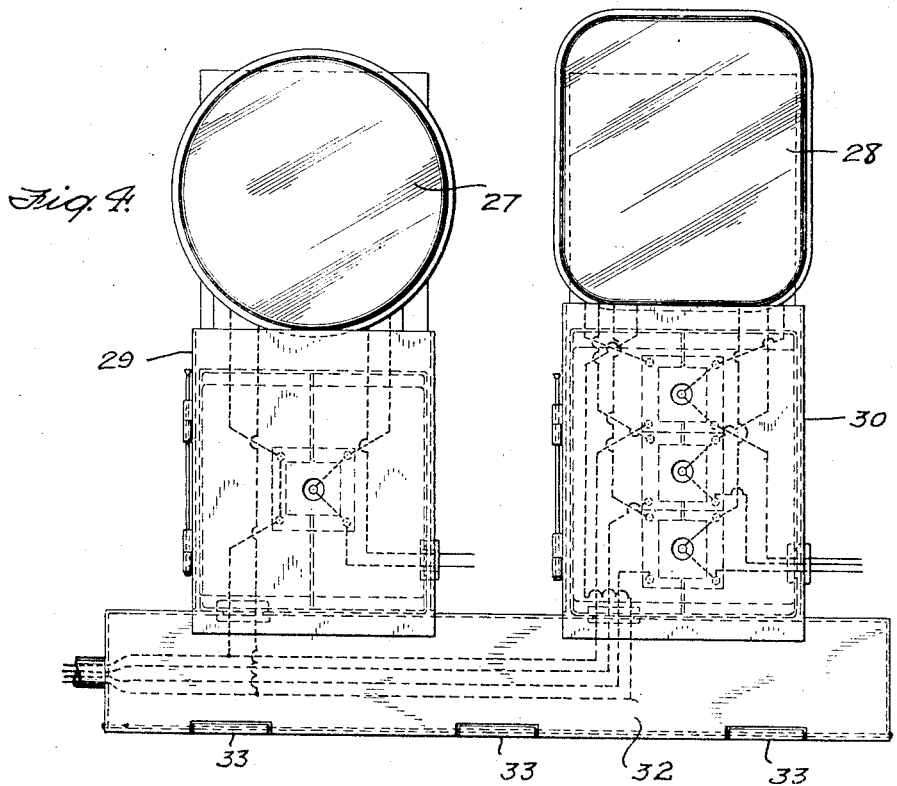
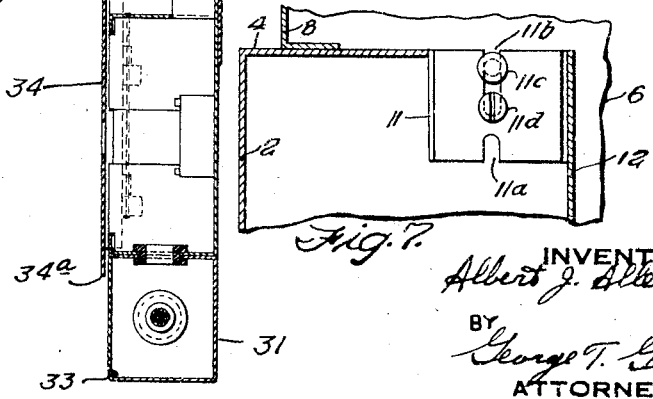
INVENTOR
Albert J. Allen
BY
George T. Gill
ATTORNEY Patented Oct. 25, 1938

2,133,944

UNITED STATES PATENT OFFICE 2,133,944

METER BOX

Albert J. Allen, Brooklyn, N. Y., assignor to Metropolitan Device Corporation, a corporation of New York Application June 18, 1937, Serial No. 148,921

10 Claims. (Cl. 247—2)

The invention herein disclosed relates to a meter cabinet and in particular to a meter cabinet that provides protection against the pilfering of electrical energy with meters of the bottom-connected type.

Certain electrical meters, and particularly watt hour meters for measuring the consumption of electrical energy, known as the bottom-connected type included a terminal chamber that extends from the meter and carries the meter terminals to which the service or unmetered and the load or metered wires are connected. It is desirable that these meter connections be sealed so that they are inaccessible except to authorized persons, and it is an object of this invention to provide a terminal box or cabinet that is especially suitable for enclosing and sealing the connections to meters of the bottom-connected type and that places all live unmetered parts under the protection of the meter cover seal.

In accordance with the invention there is provided a terminal or meter box that includes a base, side and end walls and a pivotally mounted cover. The base is extended substantially beyond one end wall and may be adapted to form a mounting base for the meter. The side walls are also extended beyond the end wall and form, with the cover, an open-end compartment adapted to receive the extending terminal chamber of a meter mounted on the base. The cover, while pivotally secured to one side of the box, is free for limited longitudinal movement. In the closed position it forms a cover for the box and a wall for the open-end compartment on the end of the box, and the edge of the cover abuts against the cover of the meter. Within the box there is a latch and a cooperating latch member is secured to the inner surface of the cover. The latch member is positioned to engage the latch within the box when the cover is closed. The latch can only be released by moving the cover longitudinally to disconnect the latch and latch member. Such movement of the box cover can be effected only when the cover of the meter is removed.

Such a meter box, embodying the invention, is illustrated in the accompanying drawings, in which:

Fig. 1 is a front elevation of the meter box;

Fig. 2 is a longitudinal section taken on the irregular line 2—2 of Fig. 1;

Fig. 3 is a transverse section taken on the irregular line 3—3 of Fig. 1;

Fig. 4 is a front elevation of a pair of modified meter boxes for use with a service cable trough;

Fig. 5 is a longitudinal section of the same;

Fig. 6 is a fragmentary section taken on the line 6—6 of Fig. 3; and

Fig. 7 is a similar fragmentary section.

The meter box illustrated in the drawings includes a base 1, side walls 2 and 3 and end walls 4 and 5, the end wall 4 having a rectangular opening therethrough. The side walls 2 and 3 have straight edges. The end walls 4 and 5 have inturned flanges 4a and 5a. The ends of these flanges are secured to the edges of the side walls 2 and 3. The purpose of this construction will later appear.

To the base 1, there is secured an extension 6 which in effect forms a part of the base 1 of the box. The extension 6 is illustrated as of the same width as the base and extends a substantial distance beyond the end wall 4. This extension, which may be of any dimensions suitable for the purpose, forms a base to which a bottom-connected type meter 7 may be secured. Only part of the meter is shown in the drawings, but the particular meter illustrated consists of a cylindrical base 7 and cover 7a and a substantially rectangular terminal chamber 7b through which the connecting wires to the meter pass. On the end of the box, there are plates 8 and 9 which are offset extensions of the side walls 2 and 3. These plates with the base extension 6, form an open-end chamber on the end wall 4. A partition 10, extending between the plates 8 and 9 and along the edge of the opening through the end wall 4, divides this open-ended compartment and forms a lower compartment into which the terminal chamber 7b of a meter base extends when the meter is mounted upon the base extension 6. In the compartment the extension 7b of the meter abuts against the edge of a U-shaped bracket and partition 11. The U-shaped bracket and partition 11 is secured to the base 1, and the legs thereof extend through slots in the end wall 4 and the partition 10. This U-shaped bracket thus divides the opening through the end wall into two rectangular openings, one for the service leads of the meter and the other for the load leads of the meter. The U-shaped bracket may be placed in any one of three positions to accommodate various types of bottom-connected meters. Two of these are provided by using one or the other of its two slots 11a and 11b engaged with a stud 11c, having an enlarged head, fixed to the base 1 or it may be secured to the base 1 by means of a screw and in this position does not extend through or above the end wall 4. In Fig. 1 the U-shaped bracket is shown in the position with the end of the slot 11a of lesser length engaging the stud 11c and in one of the three aforementioned positions; in Fig. 6 it is shown reversed with the end of the larger slot 11b engaging the stud; and in Fig. 7 it is shown with the stud at the entrance to the slot 11b and the bracket held in place by a screw 11d.

Within the box 1, there is a partition 12 that extends between the end walls 4 and 5. The partition 12 divides the box into a service compartment 12a and a load compartment 12b. The partition 12 is substantially in alignment with one leg of the U-shaped bracket 11 and thus provides an opening to the service compartment 12a that is separated from the opening to the load compartment 12b. Within the compartment 12b there is mounted a connection block 13. This connection block has a conductor strip 14 that is made in two sections 14a and 14b disconnected in the center. An extension 14a of the block extends to the edge of the partition 12, the block being secured to the base 1 or partition 12 in any suitable manner. In the front of the connection block there is an opening 14b through which access may be had to nut 15a on a bolt 15. The bolt is secured to the block between the sections 14a and 14b of the conductor 14. One wire, on the load side of the meter, is connected to one end of the block at 14a by a terminal screw 14c and the load wire is connected to the other end of the conducting strip 14 through a terminal screw 14d. When the nut 15a is screwed down on bolt 15 it bridges the gap between the sections 14a and 14b thus forming an electrical connection across the gap. This arrangement is provided so that service may be disconnected by unscrewing the nut 15a out of contact with the strip 14a and 14b and service can then be reestablished merely by screwing the nut down in place. An extension 13c on the side of the block 13 passes through an opening in the partition 12 into the service compartment and forms a connection block in the service compartment.

A cover 16 is provided for the box, consisting of a sheet metal plate having the side edges bent laterally to form flanges that extend over the edges of the side walls of the box when the cover is in the closed position. The cover is pivotally secured to the side wall 2 of the box. The hinge construction for pivotally securing the cover to the box may consist of any of the well known forms of pivotal, sliding hinges. As illustrated it includes two pair of brackets 17a, 17b, and 18a, 18b, secured to the side wall 2. The brackets 17a and 17b are adjacent one end of the side wall and the brackets 18a and 18b are adjacent the other end of the side wall. A rod 19 extends through these brackets and is secured therein in spaced relation to the side wall 2. A bracket 20 secured to the flange 16a of the cover surrounds the rod 19 between the brackets 17a and 17b and similar bracket 21, secured to the flange 16a of the cover surrounds the rod 19 between the brackets 18a and 18b. The brackets 17a and 17b are spaced apart longitudinally of the side wall a distance substantially greater than the width of the bracket 20. Likewise the brackets 18a and 18b are spaced apart longitudinally of the side wall a distance substantially greater than the width of the bracket 21. The brackets 20 and 21 are slidable on the rod 19 so that the cover 16 may be shifted longitudinally of the meter box. The amount of longitudinal movement of the cover is of course limited by brackets 17a, 17b, and 18a, 18b. The cover 16, as is clearly illustrated in the drawings, is substantially longer than the distance between the end walls of the box and in the closed position extends above the end wall 4 to form a closure for the compartment formed above the end wall.

On the inside of the box and secured to the side wall 3, there is a spring latch member 22. This spring latch member has a hook-shaped section 22a at the free end thereof. The latch consists of a V-shaped piece of strip metal one leg of which is welded to the side 3 and the other leg of which is free and forms a spring latch. On the cover of the box there is secured a latch member 23 that is positioned to cooperate with the latch 22. The latch member 23 has a hook-shaped section 23a which is the reverse of the hook-shaped section 22a. When the cover is in the closed position as shown in full lines in Fig. 1, that is, when the brackets 20 and 21 are respectively abutting against the brackets 17b and 18b, the latch member 23 is engaged by the spring latch 22. The edges 4a and 5a of the end walls 4 and 5 are turned in and welded at their ends to the side walls so as to prevent access to the latch. The flanges on the cover completely prevent access from the sides.

Since both of these latches are within the box, there is no way in which the latch can be disengaged except by shifting the cover longitudinally of the box. When the cover is shifted longitudinally of the box, to a position shown in broken lines in Fig. 1, the latch member 23 is disengaged from the latch 22 as will be seen by the dotted position of the latch member shown in Fig. 1 and indicated by 23'. It will be noted however that when a meter with its cover on is on the base extension 6, it is impossible to move the cover 16 longitudinally of the box and so position the cover as to release the latch and latch member. The cover therefore can only be opened by removing the cover of the meter 7 which is of course sealed in place. The connections from the supply through the meter to the load are thus not only separated within the box but they are completely protected as long as the meter cover remains sealed in place on the meter.

The cover 16 is provided with an opening 16a which, in the closed and latched position of the cover, is in alignment with the recess 13b in the block 13. This opening in the cover 16 is normally closed by a supplementary cover 24 that is pivotally secured to the cover 16 at 25. The cover 24 is provided with a sealing post 26 which, in the closed position of the cover, abuts against a corresponding post 22b fastened to the box and extending through a slot in the cover. Openings through the cover sealing post 26 and the box sealing post 22b are aligned in the closed position of the cover and are provided for a seal or padlock which seals the covers 24 and 16 in the closed position. If it be desired to disconnect the service, it is only necessary to open the cover 24 and manipulate the nut 15a as heretofore described. When the service is disconnected the connections to the meter and the supply wires remain sealed as the opening of the cover 24 gives access only to conductors on the load side of the meter.

In Figs. 4 and 5, the invention is illustrated in conjunction with a plurality of meters and a service-cable trough. The meters 27 and 28 represent two different types of meters, both however of the bottom-connected type. These meters are mounted respectively in conjunction with meter boxes 29 and 30 embodying this invention.

These meter boxes are identical in construction with the exception that the connection block within the meter box 30 is for a three phase meter and the connection block within the meter box 29 is for a single phase meter. For this reason but one of these meter boxes, the box 29 will be described in detail.

Below the meter boxes 29 and 30 there is mounted a service-cable trough 31. This service-cable trough is a rectangular sheet metal box having side and end walls. The upper side wall 31a is in contact with the lower end wall of the meter box and openings are provided in the usual way for the passage of service wires through the upper side wall of the service-cable trough and the lower end wall of the meter box. The service-cable trough is provided with a cover 32 that is pivotally secured at 33 to the edge of the lower side wall 31b.

The meter box 29 is in all respects identical with the meter box illustrated in Figs. 1 to 3 with the exception that the cover 34 extends, as at 34a, below the lower end of the meter box in the closed and locked position of the cover. The extension 34a overlaps the cover 32 of the service-cable trough in the closed position of the cover 32. It will thus be seen that the cover 32 of the service-cable trough is locked in the closed position when the meter box cover 29 is closed and latched.

From the foregoing description of the meter box illustrated in the drawings, it will be seen that all live unmetered parts are protected by the meter cover seal. Likewise, the construction permits the installation of a meter with the cover seal in place. This is an important advantage as it assures the utility company that the meter is in substantially the same condition as when it left the laboratory.

The fact that the longitudinal movement of the cover 16, in the direction of the meter, is limited, serves to prevent injury to the meter during unlocking of the cover 16.

It is obvious that various changes may be made by those skilled in the art in the details of the embodiments of the invention as illustrated in the drawings and described in detail above within the principle and scope of the invention as expressed in the appended claims.

I claim:

1. In a box for a meter of the bottom-connected type, having a removable cover and a terminal chamber, the combination comprising a box having a base, side and end walls and forming an enclosure for the terminal chamber of the meter, a cover for the box movable longitudinally of the box between a position in which it clears the cover of the meter and a position in which it extends into the space occupied by the cover of the meter, and means for maintaining the cover closed on the box only when positioned to clear the cover of the meter.

2. In a box for enclosing the connections to an electric meter having a removable cover, the combination comprising a box having a base, side and end walls, a cover for the box pivotally secured to a side wall of the box and movable longitudinally of the box, means within the box for latching the cover closed on the box only when positioned at one end of its longitudinal movement with respect to the box, and means for associating the box with a meter whereby longitudinal movement of the cover of the box from the position in which the cover is secured by the latching means is restrained when the cover of the meter is in place.

3. In a box for a meter of the bottom-connected type having a removable cover and a terminal chamber, the combination comprising a box having a base, side and end walls and forming an enclosure for the terminal chamber of the meter, a cover pivotally secured to the box and movable longitudinally of the box between a position in which it clears the cover of the meter and a position in which it extends into the space occupied by the cover of the meter, and latching means wholly within the box for latching the cover closed on the box only when positioned to clear the cover of the meter.

4. In a box for a meter of the bottom-connected type having a removable cover and a terminal chamber, the combination comprising a sheet metal box having a base, side and end walls, the base and side walls extending beyond one end wall and forming an open-end compartment to receive the extending terminal chamber of a meter, a cover for the box of sufficient length to substantially cover the open-end compartment, means for securing the cover to the box for pivotal and longitudinal movement of the cover relative to the box, the cover being movable longitudinally from a position in which it clears the cover of the meter to a position in which it extends into the space occupied by the cover of the meter, a latch within the box secured to one side thereof, and a cooperating latch member secured to the cover and positioned to engage the latch in the longitudinal position of the cover in which the cover clears the cover of the meter and to be out of latch engaging position in the other longitudinal position of the cover, whereby the cover is latched in one position and released in the other position.

5. In a box for a meter of the bottom-connected type having a removable cover and a terminal chamber, the combination comprising a sheet metal box having a base, side and end walls, a portion of said base extending beyond one end wall and adapted to have a meter secured thereto, extensions on the side walls forming an open-end compartment on the end of the box to receive the terminal chamber of the meter, a cover for the box of sufficient length to substantially cover the open-end compartment, a hinge for securing the cover on the box for longitudinal and pivotal movement with respect to the box, the cover being movable longitudinally from a position in which it clears the cover of the meter to a position in which it extends into the space occupied by the cover of the meter, a spring latch within the box, and a cooperating latch member on the cover positioned to engage the latch in the longitudinal position of the cover in which the cover clears the cover of the meter and to be out of latch engaging position in the other longitudinal position of the cover.

6. In a box for a meter of the bottom-connected type having a removable cover and an extending terminal chamber, the combination comprising a sheet metal box having a base, side and end walls, the base and side walls extending beyond one end wall and forming an open-end compartment to receive the extending terminal chamber of the meter, a cover for the box of sufficient length to substantially cover the open-end compartment, a hinge for securing the cover to the box comprising a rod secured to the side of the box and spaced therefrom, a bracket secured to the cover and rotatably and slidably mounted on the rod and movable from a position in which the cover of the box clears the cover of the meter to a position in which the cover of the box extends into the space occupied by the cover of the meter, a spring latch within the box, and a cooperating latch member secured to the cover and positioned to engage the latch in which the longitudinal position of the cover in which it clears the cover of the meter and to be out of latch-engaging position in the other longitudinal position of the cover, the box cover extending to the cover of the meter in the latching position thereof.

7. In a box for a meter of the bottom-connected type having a removable cover and an extending terminal chamber, the combination comprising a sheet metal box having a base, side and end walls, an extension on the base extending beyond one end wall and adapted to have a meter secured thereto, extensions on the side walls forming an open-end compartment on the end of the box of lesser width than the box to receive the terminal block of the meter, a partition in the open-end compartment extending between the side walls, a partition in the box extending between the end walls, a cover for the box of sufficient length to substantially cover the open-end compartment, a hinge for securing the cover on the box for longitudinal and pivotal movement with respect to the box, the cover being movable longitudinally from a position in which it clears the cover of the meter to a position in which it extends into the space occupied by the cover of the meter, a spring latch within the box, and a cooperating latch member on the cover positioned to engage the latch in the longitudinal position of the cover in which it clears the cover of the meter and to be out of latch-engaging position in the opposite longitudinal position of the cover.

8. In a box for a meter of the bottom-connected type having a removable cover and an extending terminal chamber, the combination comprising a sheet metal box having a base, side and end walls, an extension on the base extending beyond one end wall and adapted to have a meter secured thereto, extensions on the side walls forming an open-end compartment on the end of the box of lesser width than the box to receive the terminal block of the meter, a partition in the open-end compartment extending between the side walls, a partition in the box extending between the end walls, a cover for the box, a hinge for securing the cover to the box comprising a rod secured to the side of the box and spaced therefrom, a bracket secured to the cover and rotatably and slidably mounted on the rod, a spring latch within the box, and a cooperating latch member secured to the cover and positioned to engage the latch in one longitudinal position of the cover and to be out of latch-engaging position in another longitudinal position of the cover, the cover extending to the case of the meter in the latching position thereof.

9. In a box construction for a meter, a service-cable trough, a cover therefor hingedly secured thereto, a meter terminal box having a base, side and end walls, a cover therefor movable longitudinally of the box between a position overlapping the cover of the service-cable trough and a position out of the path of movement of the cover of the service-cable trough, and means for securing the cover of the box closed on the box in the overlapping position thereof.

10. In a construction for a meter of the bottom-connected type having a removable cover and a terminal chamber, the combination comprising a box having a base, side and end walls and forming at one end an enclosure for the terminal chamber of the meter, a service-cable trough at the other end of the box, a cover for the service-cable trough pivotally secured thereto, a cover for the box movable longitudinally of the box between a position in which it clears the cover of the meter and a position in which it extends into the space occupied by the cover of the meter, the cover of the box being of such length as to over-lap the cover of the service-cable trough when in position to clear the cover of the meter, and means for maintaining the cover closed on the box only when positioned to clear the cover of the meter.

ALBERT J. ALLEN.